United States Patent
Briffod et al.

(10) Patent No.: US 6,538,226 B2
(45) Date of Patent: Mar. 25, 2003

(54) LOAD OF PARTICLES FOR MACHINING LIQUIDS FOR ELECTRO-EROSION MACHINES, ITS PROCESS OF PRODUCTION, ITS USE AND MACHINING LIQUID CONTAINING SUCH A LOAD

(75) Inventors: Jean-Paul Briffod, Lucinges (FR); René Demellayer, Vernier (CH); Patrick Rossé, Meyrin (CH)

(73) Assignee: Charmilles Technologies S.A., Meyrin (CH)

( * ) Notice: Subject to any disclaimer, the term of this patent is extended or adjusted under 35 U.S.C. 154(b) by 8 days.

(21) Appl. No.: 09/774,634

(22) Filed: Feb. 1, 2001

(65) Prior Publication Data

US 2001/0017289 A1 Aug. 30, 2001

(30) Foreign Application Priority Data

Feb. 24, 2000 (CH) ............................................. 0357/00

(51) Int. Cl.⁷ .............................. B23H 1/08; B23H 1/10
(52) U.S. Cl. ................. 219/69.14; 219/69.11; 219/69.17
(58) Field of Search ................. 219/69.14, 69.11, 219/69.16, 69.17; 204/206

(56) References Cited

U.S. PATENT DOCUMENTS

| | | | | |
|---|---|---|---|---|
| 4,792,653 A | * | 12/1988 | Futamura | 219/69 R |
| 5,837,957 A | * | 11/1998 | Sato et al. | 219/69.15 |
| 6,156,256 A | * | 12/2000 | Kennel | 264/461 |

FOREIGN PATENT DOCUMENTS

| | | | | |
|---|---|---|---|---|
| CH | 670 785 | | 7/1989 | |
| JP | 2001-252828 | * | 9/2001 | ............ B23H/1/08 |
| WO | 8807428 A1 | * | 10/1988 | |

* cited by examiner

Primary Examiner—M. Alexandra Elve
(74) Attorney, Agent, or Firm—Young & Thompson

(57) ABSTRACT

The machining liquid includes a load of particles contained in a dielectric liquid. The particles are carbon microfibers, sectioned or not, having a diameter (e) comprised between 0.2 and 8 micrometers and a length which is a function of the machining gap (G) provided between the electrode-tool and the electrode-workpiece. Thanks to this load of carbon microfibers of well-defined dimensions and geometry, the electro-erosion output, the precision of machining, the condition of the surface obtained and the ability to replicate machining performances, are considerably improved.

18 Claims, 1 Drawing Sheet

LOAD OF PARTICLES FOR MACHINING LIQUIDS FOR ELECTRO-EROSION MACHINES, ITS PROCESS OF PRODUCTION, ITS USE AND MACHINING LIQUID CONTAINING SUCH A LOAD

FIELD OF THE INVENTION

The present invention relates to a load of particles for machining liquids for electro-erosion machines constituted by a dispersion of this load of particles in a dielectric liquid.

BACKGROUND OF THE INVENTION

It is known that the presence of particles in the machining liquid of electro-erosion machines promotes triggering the electro-erosive discharges between the electrode-tool and the electrode-workpiece and reduces the time of achieving it. Swiss patents 670,785 and 627,393 disclose the use of conductive particles, such as aluminum, copper, tin, silver, zinc and alloys of these metals, or else semiconductive particles such as graphite. These particles are added in the form of powder to the dielectric liquid. The improvements of machining performance due to these powders depends largely on several factors, among which the most important are:

The concentration of particles in the dielectric liquid which have an optimum value for each type of particle;

The geometry of the grains, namely their rugosity, their dimensions and their shapes.

The best results have been obtained, prior to the present invention, with particles of very dissymetric shape, for example lamellae or flakes, as described in Swiss patent 670,785.

Loads of known particles, however, have a considerable non-homogeneity of the granulometry of the particles whose dimensions vary greatly within a given type of load.

The machining performances of these loads thus vary greatly and do not permit controlling precisely the machining parameters of the electro-erosion machine, such as the time of triggering the electro-erosive discharges, etc. Moreover, as the granulometry is greatly variable, the number of particles in the gap can greatly vary, even more or less to obstruct this latter, in particular in electro-erosive finishing and semi-finishing machinings.

Moreover, it is known that known loads give rise to pitting and irregularities of the surface in certain portions of the electrode-workpiece. FIG. 3 shows machining an electrode-workpiece 6 with an electrode-tool 5 separating by a working space or gap G filled with a machining liquid 7 comprising a load of conventional particles contained in a dielectric liquid. The load could for example be that described in Swiss patent 670,785, constituted by lamellae or flakes of all dimensions. Under the influence of the electric field produced during discharges, the largest lamellae orient by a point effect preferentially about the edges and the ends of the electrode-tool in the vicinity of which the electric field is the strongest. The alignment of the lamellae in this field gives rise to undesirable pitting of the electrode-workpiece. This pitting is the more pronounced the longer are the lamellae that are used.

SUMMARY OF THE INVENTION

The invention has for its object to overcome these drawbacks and to permit machining with improved, constant and predeterminable performance, and this even during semi-finishing and finishing machining, whilst ensuring high machining precision. It is characterized to this end by the fact that said load is comprised of carbon microfibers having a predetermined range of lengths and having a given diameter.

These characteristics ensure a load of particles having a well-defined and controlled granulometry, comprising microfibers of constant size and shape. There is thus obtained a controlled number of particles in the gap. The triggering time is shortened, permitting improved and constant machining performance from one load batch to another, without variation in time due to supply. There can also be enjoyed a saving in load, because a similar effect is obtained with a lesser quantity of microfibers. Moreover, pitting and surface irregularities on the electrode-workpiece can be avoided because of the controlled granulometry of the microfibers which thus do not form masses of large particles at the point of the electrode-tool. Machining precision is thus substantially improved.

These characteristics also ensure loads particularly well suited to finishing or semi-finishing machining, permitting that a controlled number of particles occupy the interval between the electrode-tool and the electrode-workpiece.

Preferably, the carbon microfibers are sectioned microfibers. These characteristics ensure particularly high, constant and controlled machining performance and a very regular machining without undesirable pitting of the electrode-workpiece facing the edges, points and asperities of the electrode-tool.

Preferably, the carbon microfibers have a predetermined length selected between 1 and 100 micrometers, preferably between 5 and 20 micrometers, the diameter of the microfibers being comprised between 0.2 and 8 micrometers.

These microfibers have a constant or statistically controlled length, permitting obtaining a load with optimum and constant characteristics for a given machining. Carbon is particularly well adapted for producing sectioned microfibers.

These carbon microfibers are preferably fibers of polyacrylonitrile that have been pyrolized and sectioned. There is thus obtained a high constancy as to diameter of the microfibers because the original polyacrylonitrile fibers have a substantially constant diameter.

According to a modification, the microfibers are carbon microtubes having closed or open ends.

The invention also relates to a process for production of a load of particles for machining liquids for electro-erosion machines, and is characterized to this end in that there are prepared carbon fibers from polyacrylonitrile fibers by thermal pyrolysis treatment adapted to expel oxygen, hydrogen and nitrogen, the fibers being reduced in size to obtain carbon microfibers having a predetermined range of lengths.

These characteristics permit rational, precise and inexpensive production of loads of well-calibrated carbon microfibers.

A preferred embodiment of the process is characterized by the fact that said predetermined range of lengths of the microfibers is a function of the width of the machining gaps intended for electro-erosion, this range being comprised between ¹⁄₁₀ and 1 time (10% and 100%) the intended machining gaps, preferably between ⅙ and ½ (16.6% and 50%) the intended machining gap, more preferably between ¼ and ½ (25% and 50%) the intended machining gap.

It is thus possible to obtain microfibers of a length perfectly adapted to the width of the machining gap such that a given number of sectioned microfibers can occupy the interval between the electrode-tool and the electrode-workpiece. This contributes to controlling and optimizing the wear, the dimensions, the deformation, the speed and the surface condition of machining.

The invention also relates to the use of a load of particles for machining liquids by electro-erosion, constituted by a dispersion of this load in a dielectric liquid, and it is characterized to this end by the fact that there is selected for the machining liquid a load comprised of carbon microfibers whose range of points is a function of the intended machining gap between an electrode-tool and an electrode-workpiece, and by the fact that this range of lengths is comprised between 1/10 and 1 time the intended machining gap, preferably between 1/6 and 1/2 the intended machining gap, and more preferably between 1/4 and 1/2 the intended machining gap.

The invention also relates to a machining liquid and is characterized to this end by the fact that the concentration of carbon microfibers in the machining liquid is comprised between 0.25 and 4 g/l, preferably between 1 and 2.5 g/l.

BRIEF DESCRIPTION OF THE DRAWINGS

Other advantages will become apparent from the description hereinafter of the invention given in greater detail with the help of drawings which schematically and by way of example show one embodiment.

DETAILED DESCRIPTION OF THE INVENTION

Figure 1:
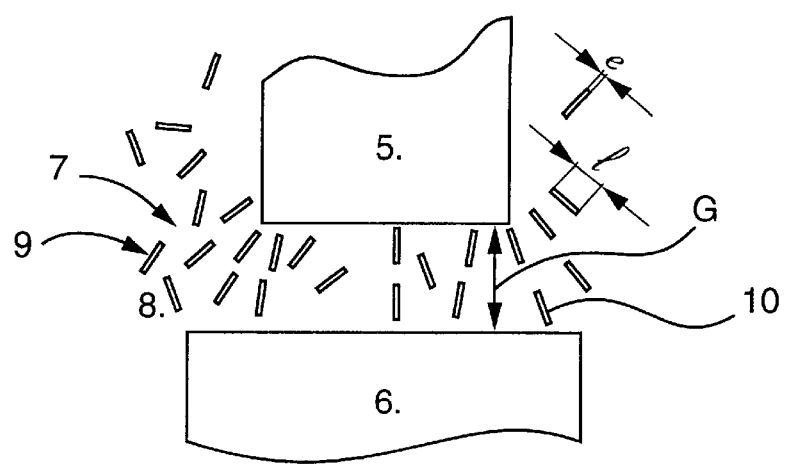
FIG. 1 is a view through the machining region of an electro-erosion machine.

With reference to FIG. 1, an electrode-tool 5 is separated from an electrode-workpiece 6 by a machining interval or gap G. The two electrodes 5 and 6 are surrounded by a machining liquid 7 comprising a dielectric liquid 8 and a load 9 of particles contained in this liquid.

This load is comprised of sectioned carbon microfibers 10 with a predetermined length 1 and having a diameter e and comprised between 0.2 and 8 micrometers. The length 1 of the sections of microfibers can be selected according to the regime and the machining gap used.

The upper and lower limits of the length l of the microfibers is between 1 and 100 micrometers, and more frequently between 5 and 20 micrometers. Thus, there are used sectioned carbon microfibers having a length comprised between 1/10 and 1 time the intended machining gap.

Preferably, this gap is comprised between 1/6 and 1/2 the intended machining gap and more preferably between 1/4 and 1/2 the intended machining gap.

It is thus possible to use, for each machining phase and regime, roughing, semi-finishing, finishing, a load of different microfibers 10 suitable for the machining gap for which the load has maximum efficiency.

It is also possible to use, during all the machining of a workpiece, the same load of microfibers whose length corresponds to that used for the last finishing gaps, for which the load has maximum efficiency.

A given load can have either sectioned carbon microfibers of a single constant length l, or microfibers of predetermined different lengths, but statistically controlled.

These carbon microfibers thus have a controlled range of lengths, for example with a Gaussian distribution with a reduced distribution, such as 1/10 of the mean length of the microfibers. This range could also have more than one maximum and a distribution other than Gaussian, for example asymmetric. Of course, the carbon microfibers could also be of a single size and shape.

As dielectric liquid 8, there can be used all conventional products, such as water, preferably deionized, hydrocarbons or mixtures of hydrocarbons, mineral oils or silicone oils, polyalcohols, etc. Various additives, anti-corrosion agents, surface active agents, soaps, emulsifiers can also be added according to the machining application.

The concentration of sectioned carbon microfibers in the machining liquid is preferably comprised between 0.25 and 4 g/l, preferably between 1 and 2.5 g/l.

This load of microfibers can be present, before its mixture with the dielectric liquid, in the form of a powder or else in the form of a premixed load either liquid, with a more or less great viscosity, or pasty with a high concentration of microfibers.

This premixed liquid or paste permits easy manipulation of the microfibers which otherwise would have a markedly irritating effect. Any risk of fire is also avoided. The dosage and the suspension of the microfibers in the machining liquid are facilitated.

Figure 2:
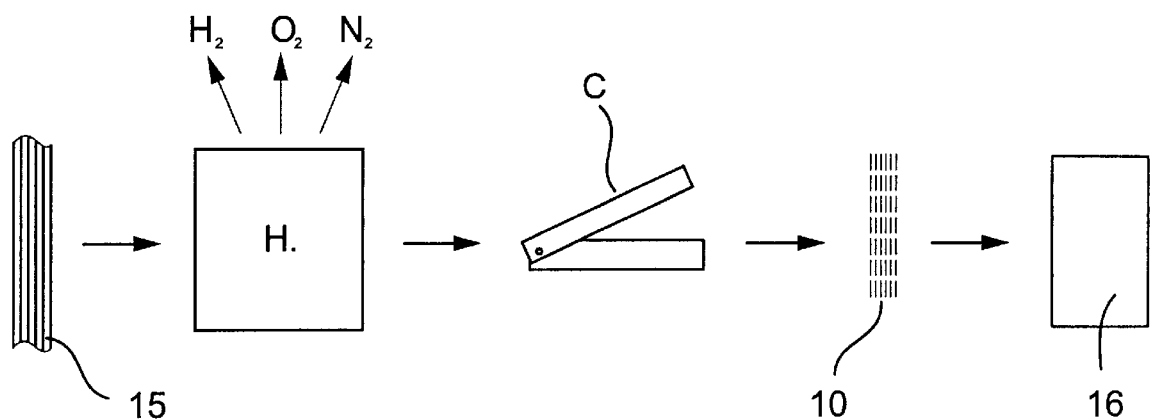
FIG. 2 shows schematically an installation for production of sectioned carbon microfibers used in the present invention.
Figure 3:
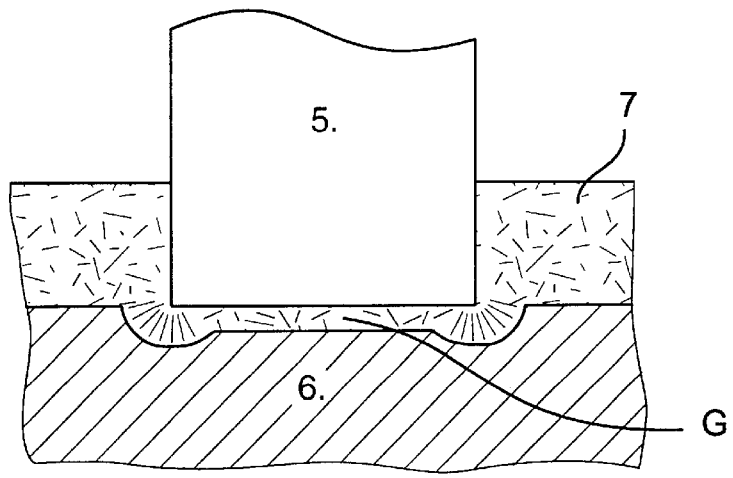
FIG. 3 shows a view through the machining region comprising a machining liquid with a known load.

Sectioned carbon microfibers 10 can be obtained according to the following production process. As starting product, there is used polyacrylonitrile fibers 15 (FIG. 2). These organic fibers are aligned and stretched parallel to their axis and subjected to a thermal treatment between 300° C. and 550° C. in an oven H with an inert atmosphere. The oxygen, hydrogen and nitrogen atoms are thus expelled. Beyond 500° C., pyrolysis takes place. The final fiber after cooling has a diameter of 4 to 8 micrometers, more often between 5 to 7 micrometers. It has a carbonated composition and an amorphous structure, slightly oriented parallel to the axis of the fiber.

This carbon fiber is then sectioned by means of a cutting device C to a predetermined length which will be either constant or statistically controlled so as to give a load or a powder with optimum characteristics for a given type of machining. As the cutting device C, there can preferably be used either a laser device or an electrical or mechanical device. The load thus obtained is packaged 16 in the form of a powder or a liquid or pasty premix.

This load of sectioned carbon microfibers thus obtained is mixed by the user with the dielectric liquid in predetermined concentrations.

The sectioned microfibers take on, during an electric discharge applied between the electrode-workpiece and the electrode-tool of an electro-erosion machine by immersion or by filament, an orientation under the influence of the electric field produced, analogous to that of liquid crystals. They thus decrease the dielectric distance, shortening and making uniform the triggering delays or time for achieving erosive discharge. The output or the speed of removal, namely the product of the frequency of erosive discharges and the mean quantity of material removed during each erosive discharge, and the obtained surface condition, are substantially improved relative to the known loads and machining liquids. The loads formed of microfibers of constant or statistically controlled geometry and dimensions, permit moreover guaranteeing machining performances that are similar or identical from one lot to another without variation with time due to supply. Pitting and irregularities of removal of material are avoided, which ensures a precise machining.

A suitable device for supplying powder or a load in the machining region permits using the best load for a given machining regime.

Of course, the embodiment described above is without limiting character and can be the subject of all desirable modification within the scope as defined by the claims. In particular, a given load of microfibers could contain microfibers of several predetermined different lengths (1). The load could also contain other particles than carbon microfibers. The process of production of the microfibers could be different and could be carried out with other original substances, for example tar. Thus, the process could comprise a phase during which the fibers are ground to obtain uncalibrated microfibers and a phase of sorting and calibration during which the fibers are sorted according to their dimensions to obtain a predetermined range of lengths. The sorting of the microfibers could take place by any suitable means, such as screening, selection by gravitation or electrostatic selection, techniques of separating using surface tension.

The organic fibers, polyacrylonitrile or others, could be completely pyrolized or if desired subjected only to a partial superficial pyrolysis. These fibers could be cut or sectioned after or even before the pyrolysis phase. This, certain types of fibers could be cut more easily before pyrolysis.

According to a modification, there could be used microfibers in the form of carbon microtubes having closed or open ends. These microtubes could thus have smaller dimensions, for example a length of 1 micrometer for a diameter of 0.2 micrometer.

What is claimed is:

1. A load of particles for machining liquids for an electro-erosion machine, constituted by a dispersion of the load of particles in a dielectric liquid, wherein said load is composed of carbon microfibers having a predetermined range of lengths and a given diameter and the carbon microfibers are pyrolized and sectioned fibers of polyacrylonitrile.

2. A load of particles for machining liquids for an electro-erosion machine, constituted by a dispersion of the load of particles in a dielectric liquid, wherein said load is composed of carbon microfibers having a predetermined range of lengths and a given diameter and the microfibers are carbon microtubes having closed or open ends.

3. A process for the production of a load of particles for machining liquids for an electro-erosion machine, constituted by a dispersion of the load of particles in a dielectric liquid, wherein said load is composed of carbon microfibers having a predetermined range of lengths and a given diameter and the carbon microfibers are pyrolized and sectioned fibers of polyacrylonitrile, the process comprising: preparing fibers of carbon from fibers of polyacrylonitrile by thermal treatment of pyrolysis adapted to expel atoms of oxygen, hydrogen and nitrogen, and reducing the fibers in size to obtain carbon microfibers having a predetermined range of lengths.

4. The process according to claim 3, wherein the fibers are reduced in size by sectioning with a cutting device.

5. The process according to claim 4, wherein the cutting device is selected from the group consisting of a laser device, an electrical cutting device and a mechanical cutting device.

6. The process according to claim 3, wherein the fibers are reduced in size by crushing to obtain microfibers and sorting the crushed microfibers to obtain microfibers having a predetermined range of lengths.

7. A process for machining an electrode-workpiece with an electrode tool separated by a machining gap filled with a machining liquid comprising a dispersion of a load of particles in a dielectric liquid, wherein said load is composed of carbon microfibers having a predetermined range of lengths and a given diameter and the carbon microfibers are pyrolized and sectioned fibers of polyacrylonitrile, and wherein the load is comprised of carbon microfibers whose range of lengths is a function of the machining gap and the range of lengths is comprised between 10% and 100% the width of the machining gap.

8. The process according to claim 7, wherein there is used for each successive machining regime of a machining, a load of different carbon microfibers corresponding to the regime and to the machining gaps in question for which the load has maximum efficiency.

9. The process according to claim 7, wherein there is used during all the machining of a workpiece the load of microfibers corresponding to the last regime and finishing machining gap for which the load has maximum efficiency.

10. The process according to claim 7, wherein the range of lengths of the microfibers is between 16.6% and 50% the width of the machining gap.

11. The process according to claim 10, wherein the range of lengths of the microfibers is between 25% and 50% the width of the machining gap.

12. A process for machining an electrode-workpiece with an electrode tool separated by a machining gap filled with a machining liquid comprising a dispersion of a load of particles in a dielectric liquid, wherein said load is composed of carbon microfibers having a predetermined range of lengths and a given diameter and the microfibers are carbon microtubes having closed or open ends, and wherein the load is comprised of carbon microfibers whose range of lengths is a function of the machining gap and the range of lengths is comprised between 10% and 100% the width of the machining gap.

13. The process according to claim 12, where there is used for each successive machining regime of a machining, a load of different carbon microfibers corresponding to the regime and to the machining gaps in question for which the load has maximum efficiency.

14. The process according to claim 12, wherein there is used during all the machining of a workpiece the load of microfibers corresponding to the last regime and finishing machining gap for which the load has maximum efficiency.

15. The process according to claim 12, wherein the range of lengths of the microfibers is between 16.6% and 50% the width of the machining gap.

16. The process according to claim 15, wherein the range of lengths of the microfibers is between 25% and 50% the width of the machining gap.

17. A machining liquid for an electro-erosion machine, constituted by a dispersion of a load of particles in a dielectric liquid, wherein said load is composed of carbon microfibers having a predetermined range of lengths and a given diameter and the carbon microfibers are pyrolized and sectioned fibers of polyacrylonitrile and wherein the concentration of carbon microfibers in the machining liquid is between 1 and 2.5 g/l.

18. A machining liquid for an electro-erosion machine, constituted by a dispersion of a load of particles in a dielectric liquid, wherein said load is composed of carbon microfibers having a predetermined range of lengths and a given diameter and the microfibers are carbon microtubes having closed or open ends and wherein the concentration of carbon microfibers in the machining liquid is between 1 and 2.5 g/l.

* * * * *